OR    4,017,156

United States Patent
Moriyama et al.

[11] 4,017,156
[45] Apr. 12, 1977

[54] ELECTRO-OPTICAL DISPLAY DEVICE

[75] Inventors: Akio Moriyama, Katano; Masakazu Fukai, Nishinomiya; Katsuji Hattori, Uji, all of Japan

[73] Assignee: Matsushita Electric Industrial Co., Ltd., Kadoma, Japan

[22] Filed: Feb. 24, 1975

[21] Appl. No.: 552,151

[30] Foreign Application Priority Data

Feb. 28, 1974   Japan ............................ 49-24010
Mar. 6, 1974    Japan ............................ 49-26503

[52] U.S. Cl. ........................ 350/160 LC; 350/157
[51] Int. Cl.² ....................................... G02F 1/13
[58] Field of Search ................... 350/160 LC, 157

[56] References Cited
UNITED STATES PATENTS 3,784,280   1/1974   Bigelow ............... 350/160 LC X
3,836,230   9/1974   Adams et al. ............ 350/160 LC

OTHER PUBLICATIONS

Scheffer T. J., "New Multicolor LC Displays That Use a Twisted Nematic Electro–optical Cell," J. Appl. Phys. vol. 44, No. 11, Nov. 1973, pp. 4799–4803.

Shanks, I. A. "Electro–optical Coulor Effects by Twisted Nematic LC," Electronics Letters, vol. 10, No. 7, Apr. 1974, pp. 90–91.
Kahn, F. J. "Cholesteric LC for Optical Applications," Appl. Phys. Lett. vol. 18, No. 6, Mar. 1971, pp. 231–233.
Dery, D. A., "Controlling Light Behavior Through Linear, Circular and Spectrally–Selective Polarisers," Manuf. Optician, vol. 17, No. 6, Mar. 1964, pp. 268–270.

*Primary Examiner*—John K. Corbin
*Assistant Examiner*—Rolf Hille
*Attorney, Agent, or Firm*—Wenderoth, Lind & Ponack

[57]    ABSTRACT

An electro-optical display device which has linear polarizer, a ¼-spectrum plate, a twisted nematic electro-optical cell disposed between the polarizer and the ¼-spectrum plate, and a power source for applying an electric field to the cell.

This device is for control, electrically, of the rotational direction of circular polarization and for electro-optical display of colors.

1 Claim, 8 Drawing Figures

ELECTRO-OPTICAL DISPLAY DEVICE

BACKGROUND OF THE INVENTION

This invention relates to an electro-optical display device, and more particularly pertains to a device designed for electrical control of the rotational direction of circular polarization, and, by the use of that device, for electro-optical display of images.

DESCRIPTION OF THE PRIOR ART

It has been known heretofore that the control of linear polarization is feasible by the arrangement briefly described hereunder: i.e. by applying a voltage to a liquid crystal layer within a cell, in which the liquid crystal is a nematic liquid crystal having a positive dielectric anisotropy and is sandwiched between two base plates and the long axes of the liquid crystal molecules are arranged in such a way that they run parallel with, and perpendicular to, the surface of the plates in the absence of and presence of a voltage, respectively.

This type of the cell is largely in use in the digit indicator of a watch, clock or electronic calculator. By controlling the linear polarization with this display device, in which the two linear polarizers are positioned on opposite sides of the aforementioned cell, an image is produced.

SUMMARY OF THE INVENTION

It is an object of the present invention to provide a device capable of performing an electrical control of the rotational direction of circular polarization.

Another object of the invention is to provide a display device for producing an image by electrically controlling the rotational direction of circular polarization.

A further object of the invention is to provide a display device for easier production of an image having complicated figures and diagrams or which is multi-colored.

These objects are achieved by the device of the invention comprising: a linear polarizer; a ¼-spectrum plate; a twisted nematic electro-optical cell disposed between the polarizer and the ¼-spectrum plate, the cell having a pair of transparent plates with transparent electrodes thereon and a nematic liquid crystal filling the space between the transparent plates; and means for applying an electric field to the cell.

Other and further objects, features and advantages of the invention will appear more fully from the following description.

DETAILED DESCRIPTION OF THE PREFERRED EMBODIMENTS

Figure 1:
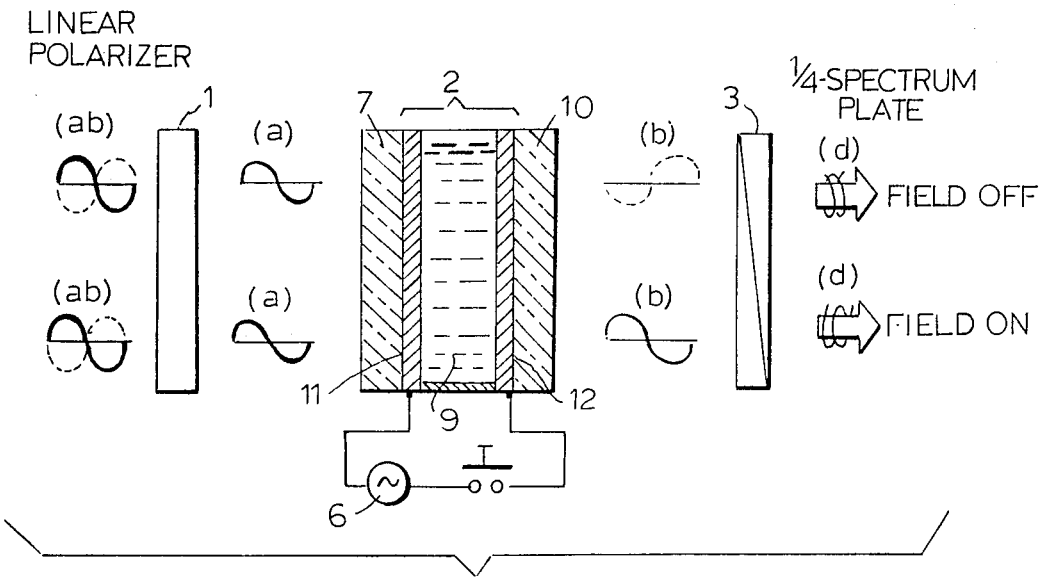
FIG. 1 is a schematic exploded plan view of the device of this invention by means of which it is possible to electrically control the rotational direction of the circular polarization.

Referring to FIG. 1, a twisted nematic liquid crystal cell 2 has means 6 to apply voltage, which liquid crystal cell 2 is disposed between a linear polarizer 1 and a ¼ spectrum plate 3.

The liquid crystal cell 2 is filled with nematic liquid crystal 9 having a positive dielectric anisotropy, between transparent base plates 7 and 10 which in turn have transparent electrodes 11 and 12 thereon. The molecular of the liquid crystal normally have their long axes parallel with the surface of plates 7 and 10, the axes of the molecules along one plate being twisted 90° to the direction of the axes of the molecules along the other plate. This is the arrangement of liquid crystal molecules at the time no electric field is applied. When the electric field is applied the voltage of which has a value over a threshold voltage for the liquid crystal molecules, the axes of the molecules become perpendicular to the plates 7 and 10.

When using the cell the liquid crystal layer of which has a twist angle of 90° as described above, the linear polarizer 1 and ¼ spectrum plate 3 are positioned such that the polarization plane of the linear polarizer 1 and the optical axis of the ¼ spectrum plate 3 are inclined at 45° to each other.

In addition, the cell 2 is positioned so that the polarization plane of the linear polarizer 1 is at a right angle to, or runs in parallel with, the direction of the alignment of the axes of the liquid crystal molecules on the inner surface of the base plate 7 of the cell 2.

With this arrangement of the device and in the absence of a voltage applied across the liquid crystal layer 9 of the cell 2, when polarized light from the linear polarizer 1 passes through the cell 2, the direction of the polarization is turned by 90° and further when it passes the ¼-spectrum plate 3, polarized light therefrom is circularly polarized either in the right- or left-handed direction of rotation.

When, at this time, voltage is applied to the liquid crystal layer 9 within the cell 2, because the polarized light from linear polarizer 1 sequentially passes through the cell 2 without being twisted, the ¼-spectrum plate 3 makes the circularly polarized light turn in the opposite direction from the case in which voltage is not applied.

Figure 2:
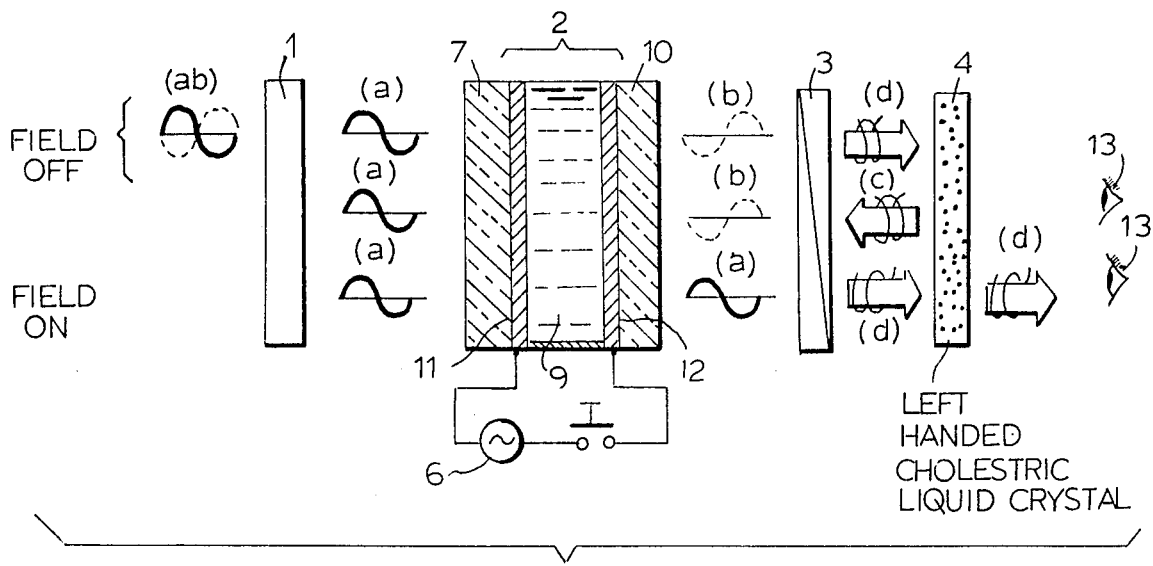
FIG. 2 is a schematic exploded view of a transmissive type image display device employing the device for electrical control of the rotational direction of the circular polarization according to this invention.

FIG. 2 shows the basic arrangement of a device of the transmission type in which a cholesteric liquid crystal liquid film 4 is positioned behind the ¼ spectrum plate 3 of the arrangement shown in FIG. 1, to make an image display possible.

Figure 3:
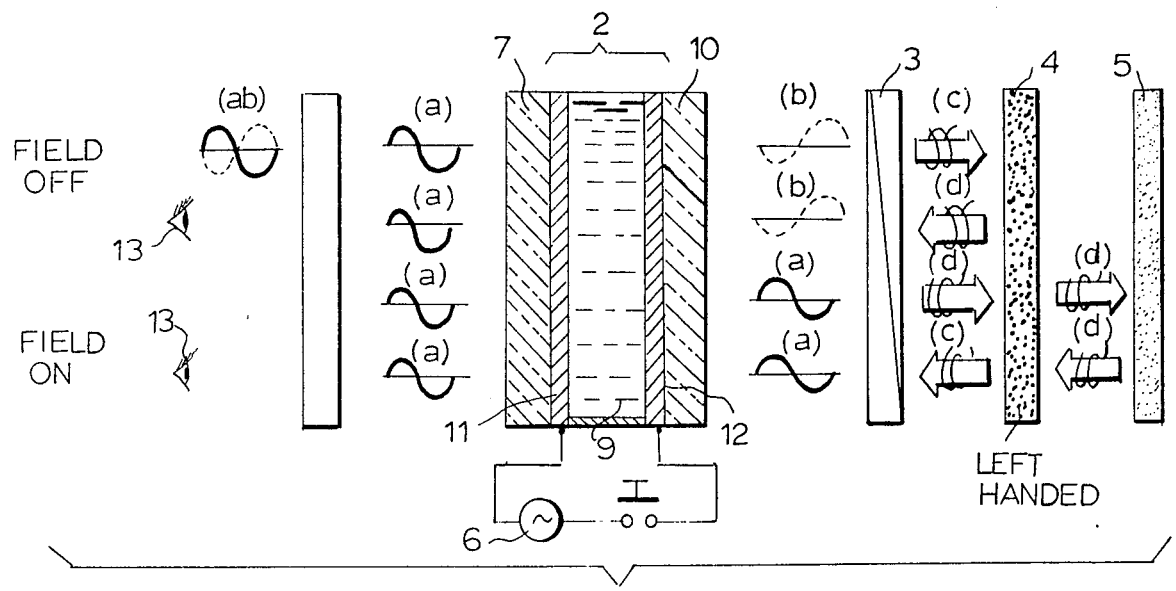
FIG. 3 is a schematic exploded view of a reflective type image display device employing the device for electrical control of the rotational direction of the circular polarization according to this invention.

FIG. 3 shows the basic arrangement of a display device of the reflective type which further has a light absorption medium 5 positioned behind the cholesteric liquid crystal film 4 for image display.

The cholesteric liquid crystal film has optical characteristics of its own. When a white light is projected onto this film, it reflects light of a specific wave length as a clear, bright color having a high purity of the wave length. In a display device, this assures a high rate of visual effect. Again with this film, when a light of white color is projected onto, one component of circular polarized light of a specific wave length is transmitted as it is, whereas the amount of the remainder of the light which is transmitted is greatly reduced.

To cite a case, when light having a wave length $\lambda°$ (= $np$ of which $n$: average refractive index and $p$: pitch) is projected onto a right-handed cholesteric liquid crystal film, the right-handed circular polarized light is transmitted, whereas the left-handed is reflected. This characteristic is called the circular dichromism of polarized light.

Now, with the device shown in FIG. 1, depending upon whether or not a voltage is applied to the cell 2, the direction of rotation of the circular polarized light is different, and therefore in the structural arrangement like that of FIG. 2 or 3, the cholesteric liquid crystal film transmission or reflection is controlled by the adjustment of voltage applied to the cell 2. The image thus formed is transmitted or reflected to an audience 13.

Given hereunder is a concrete example of this invention, based on an experiment.

Shown in FIGS. 2 and 3 are arrangements of display devices using, for instance, a left-handed cholesteric liquid crystal which has a yellowish-green tint. In the transmissive type of device of FIG. 2, with no applied voltage, unpolarized white light ($a$) ($b$) is linearly polarized in the vertical plane, as at ($a$), by the linear polarization plate 1, is twisted to horizontally polarized light ($b$) by the liquid crystal cell 2, and the optical axis of the ¼ spectrum plate 3 is adjusted so as to let only the right-handed circular polarized light ($c$) pass through, as seen in the upper part of the figure. The left-handed cholesteric liquid crystal film 4 does not let the right-handed circularly polarized light pass, so nothing is seen at 13. When the voltage is applied, however, the nematic liquid crystal cell does not twist the linearly polarized light ($a$), but passes it straight through, and it is circularly polarized in the left-hand rotational direction as at ($d$) and is passed by the cholesteric liquid crystal film 4 to be seen at 13 as a reddish purple light. The treatment of the light is similar in the device of FIG. 3, and the colors seen at 13 are as shown in Table 1.

Table 1

| Field | Transmissive Type | Reflective Type |
|-------|-------------------|-----------------|
| OFF   | None              | Black           |
| ON    | Reddish-purple    | Yellowish-green |

For a device of the reflective type shown in FIG. 3, the light absorption medium used is black. The image obtained from the reflective type of device is clear and bright with a high value of contrast.

The light absorption medium for the reflective type of device can be any color other than black, also. For instance, when a red color medium is used in the experiment an image with contrasting colors of yellowish-green and red can be created.

As explained above, the device according to this invention assures achievement of an image display system by an combination of an arrangement to control electrically the rotational direction of circular polarized light and a display means which has a circular dichromism of polarized light within the visual area.

The cholesteric liquid crystal film can, in practice, be made by the process described below.

Being substance which in liquified form has a high viscosity, the cholesteric liquid crystal can be coated on flat items, for instance, film, paper or wooden boards; but in actual use it is desirable not to let it come in contact with other materials to prevent it from getting degraded and decomposed. For this reason, it is not recommendable to use it sandwiched between a flexible material like film which causes an uneven display. Therefore, in order to obtain a film which assures evenness of the displayed colors it is best for it to be sandwiched between flat materials, one of which is transparent, like glass or plastic.

Generally speaking, simply by being inserted between the plates the cholesteric liquid crystal does not have the necessary color characteristic and, therefore, sliding stress has to be applied thereto to cause the molecular arrangement to assume the correct order.

To obtain a film having even coloring by rearranging the molecules, there is another method which is highly recommendable. This is to use a mixture of cholesteric and nematic liquid crystals, the latter having negative dielectric anisotropy, and apply to a thin layer thereof an electric field. In this case, the electric field of alternating current of $10^4 - 10^5$ kv/cm$^2$ is applied.

The cholesteric liquid crystal can be used independently or mixed with other mixtures, and it can also be used in a mixture of a cholesteric liquid crystal with a nematic liquid crystal.

The color of the cholesteric liquid crystal film varies according to the kind of liquid crystal, the mixing ratio thereof or the other kinds of materials mixed therewith. In addition, the color can change with a change in the temperature or the angle from which the liquid crystal is viewed.

For these reasons, it is desirable that the liquid crystal film be a cholesteric liquid crystal which has a wide mesomorphic range in the liquid crystal phase and, at the same time, non-variability of colors over a wide range of temperature variation as well as non-variability with regard to the angle from which the image is being viewed. One liquid crystal film 4 which satisfies these requirements is a cholesteric liquid crystal preparation, composed of a mixture of cholesteryl 1-2-(2-ethoxyethoxy) ethyl carbonate, and cholesteryl butyrate and cholestryl geranyl carbonate, combined with nematic liquid crystal of P-anistlidene-p'-n-heptylaniline, P-ethoxybenzylidene-p'-n-butylaniline, and P-n-propoxybenzyliden-p'-n-pentylaniline.

This preparation produces a left-handed liquid crystal film which causes no color change over a wide range of temperature from 0° to 60°.

Figure 4:
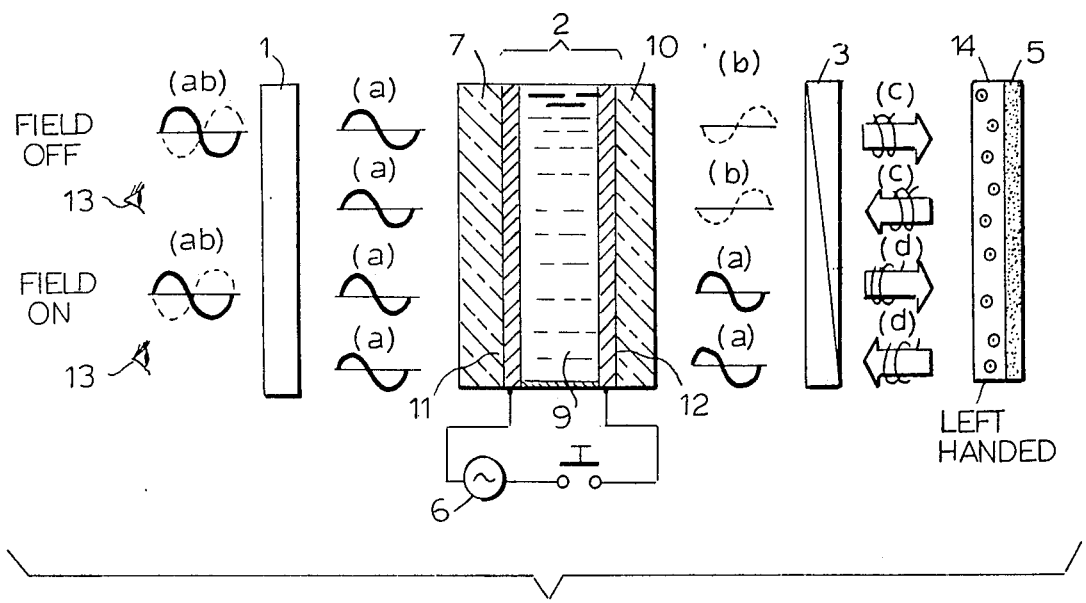
FIG. 4 is a view similar to FIG. 3 of another example of the reflective type of the display device.

FIG. 4 shows another example of a reflection type device in which the light absorption medium of the plate 5, which plate can be placed on a transparent plate (not shown), has a micro-encapsulated cholesteric liquid crystal 14 on the face thereof toward the ¼-spectrum plate to serve as the liquid crystal film equivalent to the film 4 in FIGS. 2 and 3.

This arrangement makes it possible to reduce the thickness of the reflective part so that the actual device has a compact design, and, at the same time, is easy to produce.

Figure 5:
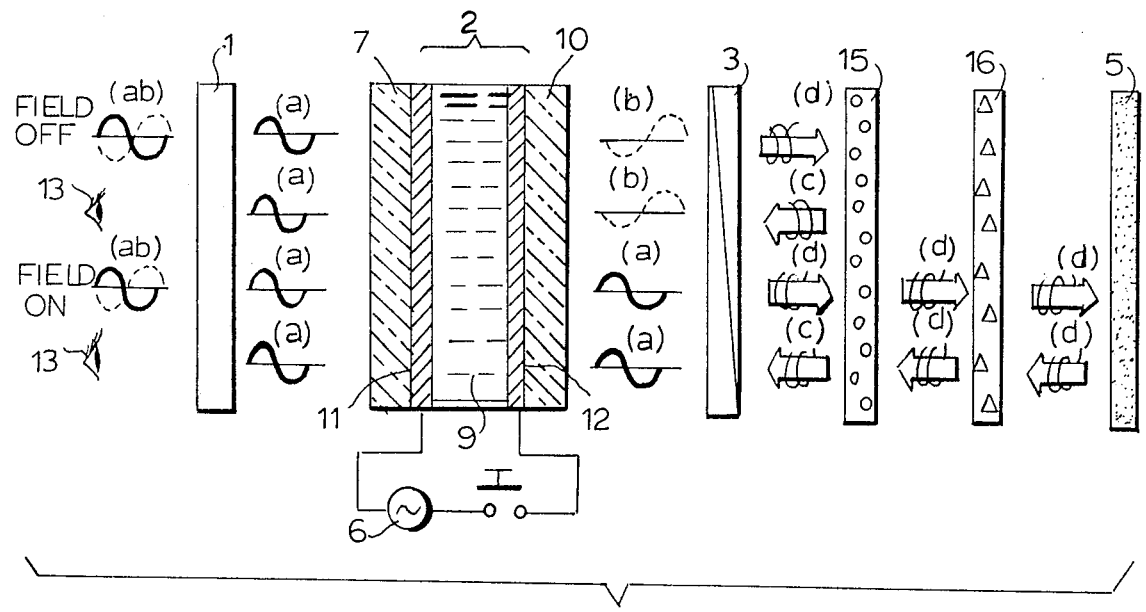
FIG. 5 is a schematic exploded view of another example of an image display device employing the device for electrical control of the rotational direction of the circular polarization according to this invention.

FIG. 5 shows a device in which are provided both right- and left-handed cholesteric liquid crystal films 16 and 15 the colors of which are mutually different, and only one or the other of the colors reaches the audience depending upon the composition of the circular polarized light transmitted from the ¼-spectrum plate 3 by the voltage control of the cell 2; i.e., by the utilization of optical characteristics of the cholesteric liquid crystals, a dichromatic display is made feasible.

Figure 6:
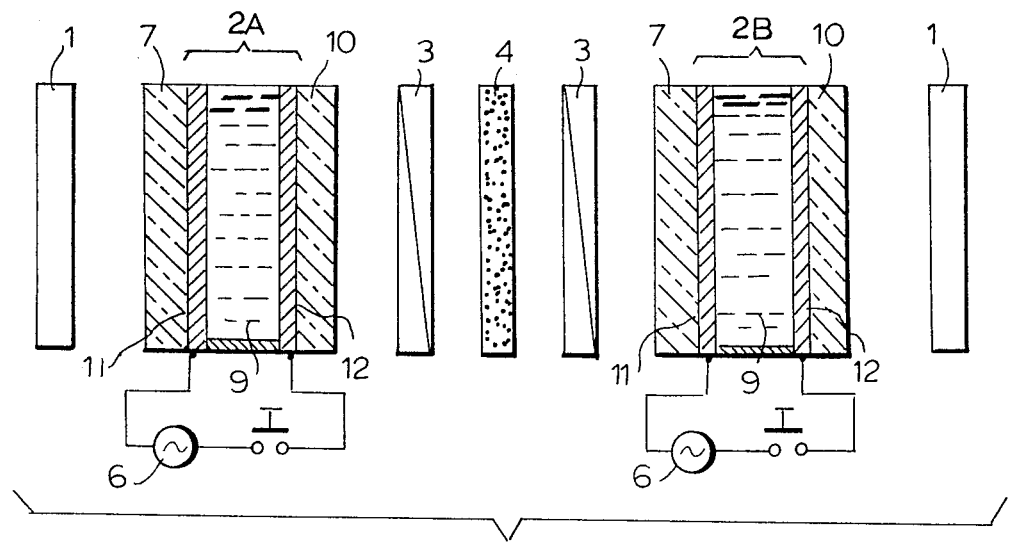
FIG. 6 is a schematic exploded view of still another example of an image display device employing the device for electrical control of the rotational direction of the circular polarization according to this invention.

FIG. 6 shows a device in which a pair of devices capable of electrically controlling the rotational direction of circular polarized light are positioned on opposite sides of a cholesteric liquid crystal film 4, and which has the added specific features of being able to easily display intricate figures and diagrams polychromatically by control of the electric signals, transmitted to the two nematic liquid crystal cells 2A and 2B.

Table 2 shows the specific color characteristics of this device when a voltage is selectively applied to the cells 2A and 2B.

Table 2

| | Cell (2A) | Cell (2B) | Colors |
|---|---|---|---|
| I | ON | OFF | Reddish-purple |
| II | ON | OFF | Yellowish-green |
| III | OFF | ON | Dark black |
| IV | OFF | ON | Reddish-purple |

In this device, the liquid crystal film 4 is left-handed, and the cholesteric liquid crystal film 4 has a yellowish-green tint and the devices on both sides of the film 4, which capable of electrically controlling the rotational direction of the circularly polarized light, have the light axes adjusted so that each of them allows transmission of the left-handed circular polarized light from the ¼ spectrum plate when no voltage is applied to the respective devices. The symbols I, II, III and IV in the table 2 designate ways of selectively applying voltage to the cells 2A and 2B with various combinations of OFF and ON conditions of voltage applied to the respective cells.

Figure 7:
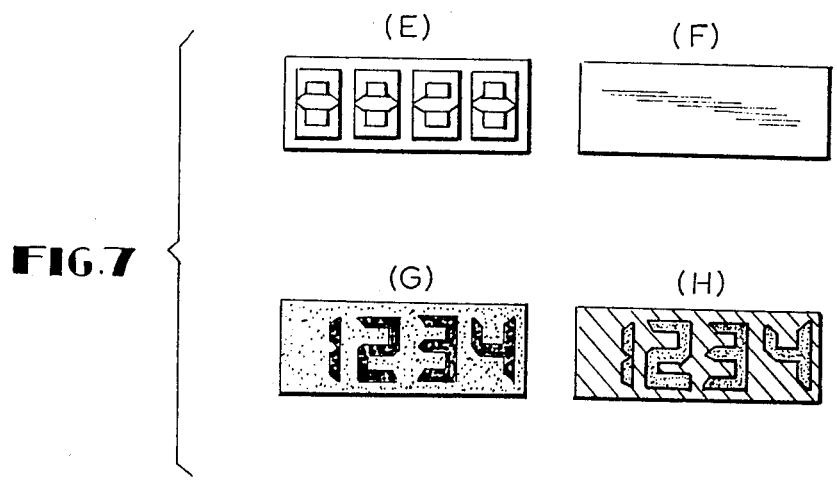
FIGS. 7 and 8 are representations of the types of images which can be displayed by the devices of FIGS. 2-6.

In FIG. 7 is shown an example of how the device shown in FIG. 6 is used for a digital display of an electronic calculator. In this embodiment, one of the two cells, e.g. cell 2B, is arranged to produce the digital pattern (E), while the other cell (2A) is left blank as at (F). The way it works will be described with reference to Table 2. With the electonic calculator so set that the digital display is performed under the normal working conditions and the blank plain cell is set to operate upon occurance of an error signal, during normal operation as shown at (G), the digits are displayed in dark black and the background is reddish-purple tint, i.e. the cell 2A is off and cell 2B is turned on and off to display or not display digits, and when an error signal is received (H) the color of the digits is changed into reddish-purple and that of the background into yellowish-green, i.e. the cell 2A is turned on and the cell 2B is turned off to display a digit on or to eliminate the display. Thus, the operator of the computer can know the error committed.

Figure 8:
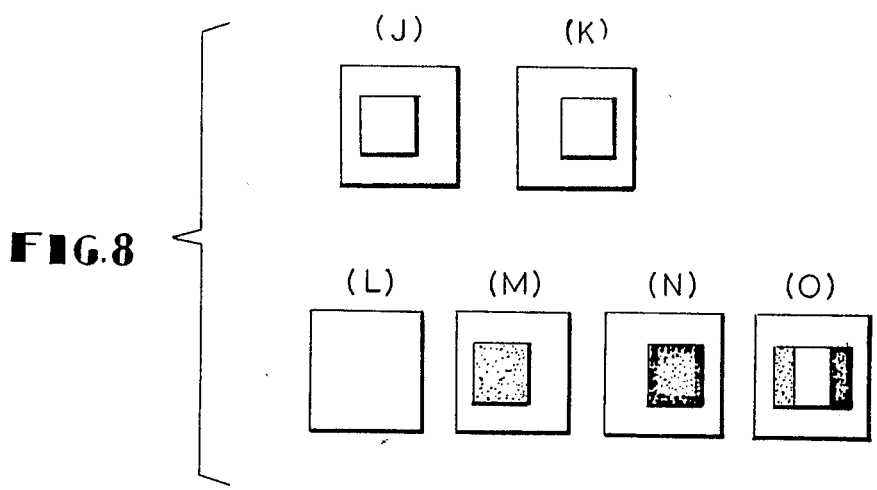

FIG. 8 shows carries another example of utilization of the FIG. 6 type device. In the set up of FIG. 8, with the cells A and B arranged in such a way that their patterns partly overlap one another in the light path as indicated by J and K in FIG. 8, voltage is selectively applied to the cells and the polychromatic displays are made possible as per L, M, N and O, also shown in FIG. 8. In this way, display of intricate figures and diagrams is easily possible. L is the visual image when no voltage applied to either cell A or B, so neither J or K appear. M shows the visual image when a voltage is applied only to A, so that only J appears. N shows the visual image when a voltage is applied only to B, so only K appears, and O shows the image when voltage is applied to both A and B.

What is claimed is:

1. An electro-optical display device of the transmissive type which comprises:

a linear polarizer for providing substantially linearly polarized light;

a twisted nematic electro-optical cell positioned in the path of the light from said linear polarizer and capable of changing the state of polarization of said light, said twisted nematic electro-optical cell being composed of a pair of spaced transparent plates with a nematic liquid crystal filling the space therebetween and said plates having transparent electrodes provided on the opposed surfaces thereof;

a ¼-spectrum plate on the opposite side of said twisted nematic electro-optical cell from said linear polarizer for exhibiting one-quarter wave length retardation and producing circularly polarized light as its output;

a cholesteric liquid crystal film on the opposite side of said ¼-spectrum plate from said cell for selectively reflecting light of a specific wave length and exhibiting circular dichromism;

means coupled to said cell for supplying an electric field to the nematic liquid crystal and including switch means for connecting and disconnecting said means from said nematic liquid crystal;

a second ¼-spectrum plate on the opposite side of said cholesteric liquid crystal film from said first mentioned ¼-spectrum plate for receiving the light which is passed through said cholesteric liquid crystal film and for producing circularly polarized light as its output;

a second twisted nematic electro-optical cell on the opposite side of said second ¼-spectrum plate from said cholesteric liquid crystal film for changing the state of polarization of light from said second ¼-spectrum plate; and a second linear polarizer on the other side of said second twisted nematic electro-optical cell from said second ¼-spectrum plate for receiving the light from said second twisted nematic electro-optical cell and providing substantially linearly polarized light.

* * * * *